United States Patent Office 3,433,614
Patented Mar. 18, 1969

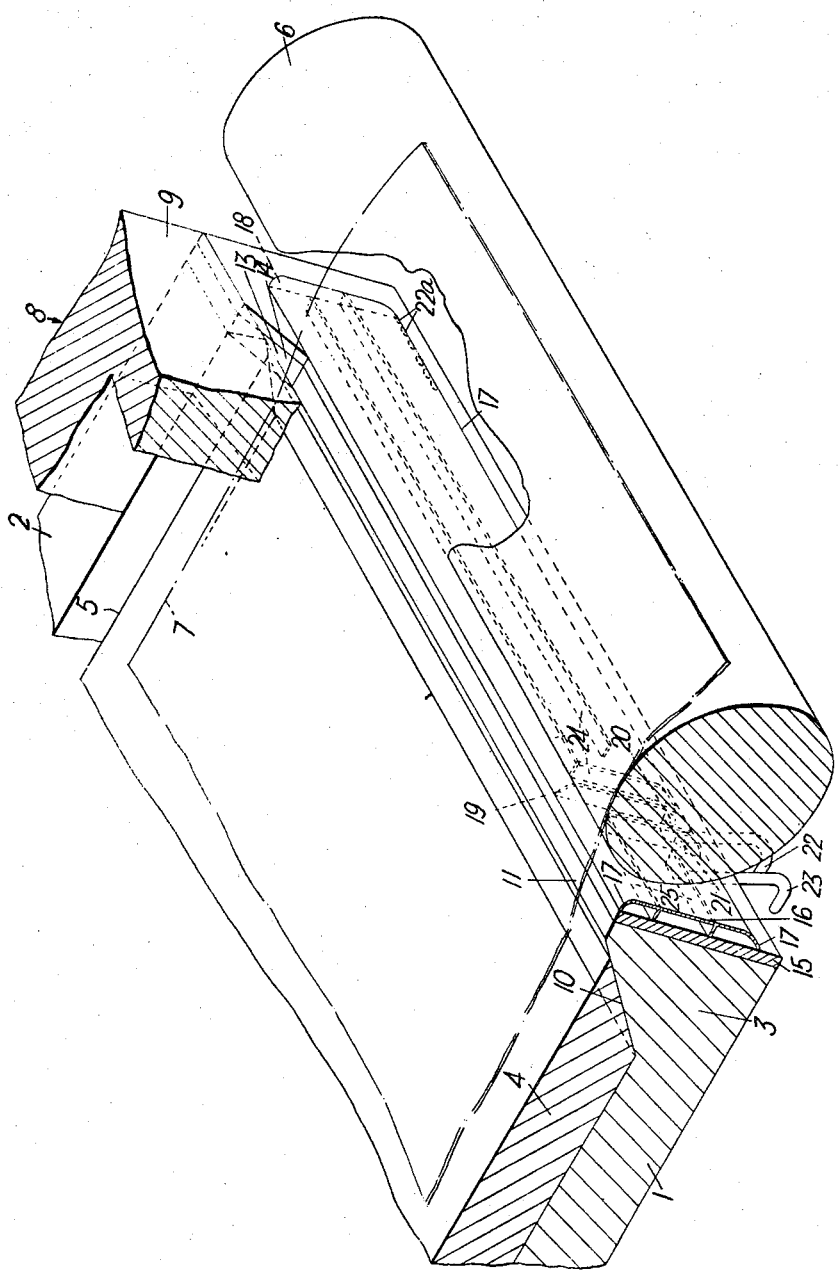

3,433,614
APPARATUS FOR MANUFACTURING FLAT GLASS
George Alfred Dickinson, St. Helens, and Anthony Preston, Ormskirk, England, assignors to Pilkington Brothers Limited, Liverpool, England, a company of Great Britain
Filed July 19, 1965, Ser. No. 472,936
Claims priority, application Great Britain, Aug. 31, 1964, 35,568/64
U.S. Cl. 65—182    3 Claims
Int. Cl. C03b *18/02*

ABSTRACT OF THE DISCLOSURE

The outlet end wall of a tank structure containing a bath of molten metal, in the float process for the manufacture of flat glass, is faced with a metal plate forming one wall of a cooling box.

---

This invention relates to the manufacture of flat glass and more especially to apparatus for use in the manufacture of flat glass in ribbon form including an elongated tank structure containing a bath of molten metal, for example tin or a tin alloy, having a specific gravity greater than glass, along which bath the glass is advanced. The bath is preferably so constituted as to have all the characteristics fully described in U.S. Patent No. 2,911,759.

A roof structure is mounted over the tank structure to define a headspace over the bath, and the roof structure defines with the outlet end wall of the tank structure an outlet through which flat glass in ribbon form is discharged from the bath on to conveyor rolls mounted beyond the outlet end of the bath. The headspace over the bath is charged with a protective atmosphere maintained at a plenum.

The outlet end wall of the tank structure is usually a refractory wall faced on the outside with a metal plate and due to differential expansion between the metal plate and its mounting the plate may tend to bow or take up a corrugated form leaving space between the plate and the refractory in which space molten metal of the bath may circulate and attack the metal plate.

It is a main object of the present invention to provide an improvement in apparatus of the kind set out above in which the end wall of the tank structure is cooled so that any harmful differential expansion between the plate and its mounting is avoided and the life of the outlet end wall of the tank structure is prolonged.

According to the invention apparatus for use in the manufacture of flat glass in ribbon form including an elongated tank structure containing a bath of molten metal and having an outlet for the discharge of flat glass in ribbon form defined over an outlet end wall of the tank structure, is characterised in that said outlet end wall of the tank structure is a refractory wall faced on the outside with a metal plate which forms one wall of a cooling box having an inlet provided with means for supplying a cooling medium under pressure to the box, an outlet for discharging said medium from the box and baffles in the box to constrain the cooling medium to flow against said metal plate through a tortuous path in the box between the inlet and the outlet.

The outlet end wall is hottest in the region of the centre of the end wall and it is preferred to supply the cooling medium to the centre of the box. In a preferred embodiment of the invention the box is divided into two parts by a central vertical partition, each part having an inlet for cooling medium near the partition, an outlet at the bottom of the box near one of its outer ends, and baffles defining a tortuous path through the box part between the inlet and the outlet.

Further according to the invention a chamber enclosing a roller is arranged to take up the ribbon of glass from the bath surface through said outlet, a protective atmosphere is maintained at a plenum in the chamber, and the outlet from each box part is formed by a series of apertures in the bottom of the box near an outer end of the box, said supplying means being operable to supply a reducing atmosphere to the box, which atmosphere is discharged through said outlet apertures to augment the plenum in the chamber.

The maintaining of the protective atmosphere at a plenum in the chamber may be effected by outward flow of protective atmosphere through the outlet from the bath from the headspace over the bath.

In order that the invention may be more clearly understood an embodiment thereof will now be described, by way of example, with reference to the accompanying drawing which is a perspective view partly in section of the construction of the outlet end of a tank structure containing a bath of molten metal and showing a roller arranged to take up a ribbon of glass from the bath surface through an outlet from the bath.

The tank structure to which the invention is applied is of the kind described and illustrated in U.S. Patent No. 3,083,551 and the tank structure includes a floor 1, side walls 2 one of which is shown in the drawing, and an end wall 3. The tank structure contains a bath of molten metal 4, for example molten tin or a tin alloy having a specific gravity greater than glass. The surface level of the molten metal bath is indicated at 5.

Glass may be delivered to the bath as a formed ribbon of glass which is subjected to thermal treatment as it is advanced along the bath to superficially melt the surface of the ribbon to remove imperfections, or a formed ribbon of glass may be advanced under thermal conditions to ensure that it is melted on the bath and the molten glass flows laterally unhindered to the limit of its free flow and is thereafter advanced in ribbon form along the bath. Molten glass may be poured on to the bath surface and flows laterally unhindered to the limit of its free flow and is then advanced in ribbon form along the bath.

Whatever method of manufacture or treatment of glass on the bath is employed the glass in ribbon form is sufficiently stiffened as it is advanced towards the outlet end of the bath to be taken off the bath unharmed on to conveyor rolls. The conveyors rolls are normally mounted beyond the outlet end of the tank structure and a take-up roller which takes up the ribbon of glass 7 off the bath surface through the outlet from the bath is shown at 6. The ribbon is delivered from the take-up roll on to the conveyor rolls and is advanced thereby to the usual annealing lehr. The take-up roller 6 may be mounted in a chamber forming an extension of the tank structure.

A part of the roof structure mounted over the tank structure to define a headspace over the bath is indicated at 8 and includes an end wall 9. The end wall 9 of the roof structure extends right across the end wall 3 of the tank structure and the outlet from the bath is defined between these two end walls 3 and 9. The end wall 3 of the tank structure slopes upwardly from the floor 1 of the tank as indicated at 10, to form a narrow lip 11 which is the top surface of the end wall 3. The lip 11 is formed in a cut-away part of the top surface of the end wall 3 which top surface slopes upwardly, as shown at 13, at both sides of the wall 3 so that the outlet 14 from the bath is formed by the cut-away lip 11 in the top of the end wall 3 of the tank structure.

The end wall 3 is formed of refractory material and is faced on the outside with a metal plate 15 of heat-resisting steel which had a cut-away top shape to match the lip 11 and 13 of the end wall of the tank structure.

The metal plate 15 is protected from attack by the molten metal 4 of the bath by the upwardly extending end wall 3 of the tank structure, but if the metal plate should become over-heated, the temperature of the outlet end of the bath normally being about 600° C., then expansion of the plate may lead to molten metal reaching the metal plate 15 around the refractory elements forming the wall 3.

In order to prolong the life of the metal plate 15 it is cooled according to the invention to a temperature about 200° C. less than that of the bath metal at the outlet end of the bath, and to effect this cooling the metal plate 15 forms one wall of a cooling box defined by welding a box section 16 to the plate 15. The thickness of the box section 16 is less than that of the plate 15, and the box section has inwardly curved upper and lower edges 17 and ends 18 which are all welded to the plate 15, and the cooling box is divided into two parts by a central vertical partition 19 which is also welded to the metal plate 15.

Each part of the cooling box has an inlet, respectively 20 and 21, which inlets are connected to pipes 22 and 23, through which a cooling medium is supplied. The cooling medium is preferably a reducing atmosphere, for example a substantially inert gas containing about 5% of hydrogen. Near each of the outer ends of the box the lower curved wall 17 is provided with a series of outlet apertures. One series 22a is shown in the drawings, and considering the part of the cooling box shown in the drawing, the cool atmosphere supplied under pressure through the pipe 22 to the inlet 20 is constrained to flow against the surface of the metal plate 15 through a tortuous path in the box between the inlet 20 and the outlets 22a by means of baffles 24 welded in the box between the outer box section 16 and the metal plate 15. As shown in the drawing, three baffles are provided which ensure that the cool atmosphere flows first upwardly and then three times along the length of the half of the metal plate so that the metal plate is cooled by the atmosphere before the atmosphere is discharged through the outlets 22a into sides of a chamber enclosing at least the first take-up roll 6. The other half of the cooling box is similarly provided with baffles 25 and cool atmosphere supplied through the pipe 23 also follows a similar tortuous path against the other half of the metal plate 15 so that the whole of the metal plate and the end wall of the tank structure is cooled.

It has been found that with a flow of cooling atmosphere of approximately 500 cubic feet per hour the temperature of the outlet end wall 3 is reduced by about 200° C. The end wall 3 is hottest at its centre and the cool atmosphere is therefore applied at the centre and at each side of the partition 19 as illustrated in the drawing, so that the initial heat exchange cools the central region of the plate 15 more than the final heat exchange near the outlets 22a, and a substantially uniform temperature is maintained over the whole of the end wall 3. The heated atmosphere discharged through the outlets 22a is cooler than the ribbon of flat glass 7 supported by the conveyor rolls 6, and the atmosphere is discharged downwardly away from the glass ribbon so that it does not come into contact with the ribbon of glass. The discharge of the atmosphere at the sides of the end wall does, however, augment the plenum of protective atmosphere in the chamber in which the roll 6 is located.

By this improved apparatus according to the invention for cooling the outlet end wall of the tank structure deformation of the metal plate facing the end wall is minimised and the life of this end wall is greatly increased.

We claim:

1. Apparatus for use in the manufacture of flat glass in ribbon form, comprising an elongated tank structure containing a bath of molten metal and formed with an outlet for the discharge of flat glass in ribbon form from the bath, said outlet being defined over a refractory outlet end wall of the tank structure, a metal plate facing the upright outer face of the end wall and extending upwardly substantially to the outlet, a cooling box attached to that end wall and open to the outer face of the metal plate and extending upwardly substantially to said outlet, an inlet to the cooling box, means for supplying a cooling medium under pressure to the box through the inlet, an outlet from the box for discharging said medium from the box, and baffles in the box to constrain the cooling medium to flow against said metal plate through a tortuous path in the box between said inlet and outlet.

2. Apparatus according to claim 1, including a central vertical partition dividing said cooling box into two parts, an inlet to each part of the box near the partition, an outlet from each box part near one of the outer ends of the box, and baffles in each box part defining a tortuous path between the inlet and the outlet.

3. Apparatus according to claim 2, including a chamber extending from said outlet end wall of the tank structure, a roller so mounted in the chamber as to take up the ribbon of glass from the bath surface through said outlet, means for maintaining a protective atmosphere at a plenum in said chamber, and means for supplying a reducing atmosphere to said inlets, the outlet from each box part being formed by a series of apertures in the bottom of the box near the outer end of the box, through which outlet apertures reducing atmosphere is discharged to augment the plenum in the chamber.

References Cited

UNITED STATES PATENTS

| 789,911 | 5/1905 | Hitchcock | 65—182 |
| 3,351,450 | 11/1967 | Silverwood | 65—182 |

DONALL H. SYLVESTER, *Primary Examiner.*

A. D. KELLOGG, *Assistant Examiner.*

U.S. Cl. X.R.

65—65, 99, 186, 337, 356